(12) United States Patent
Van Gestel

(10) Patent No.: US 6,850,696 B1
(45) Date of Patent: Feb. 1, 2005

(54) METHOD OF STORING A REAL TIME STREAM OF INFORMATION SIGNALS ON A DISC LIKE RECORD CARRIER

(75) Inventor: Wilhelmus J. Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/674,209

(22) Filed: Oct. 27, 2000

(30) Foreign Application Priority Data

Mar. 1, 1999 (EP) .............................................. 99200569

(51) Int. Cl.⁷ ................................................ H04N 5/91
(52) U.S. Cl. ...................................... 386/95; 386/125
(58) Field of Search ........................ 386/45, 68, 81–82, 386/111–112, 98, 125–126; 348/423.1

(56) References Cited

U.S. PATENT DOCUMENTS 5,905,845 A  *  5/1999  Okada et al. .............. 386/1.26
6,370,322 B2 *  4/2002  Horiguchi et al. ............ 386/95
6,741,798 B2 *  5/2004  Maruyama et al. ........... 386/95

* cited by examiner

*Primary Examiner*—Thai Tran
*Assistant Examiner*—Christopher R Onuaku
(74) *Attorney, Agent, or Firm*—Michael E. Belk

(57) ABSTRACT

A method of storing a substantially real time stream of information signals arranged in separate, consecutive data packets of digital format on a disc like record carrier. A new stream pack (S_PCK) is defined comprising a pack header and a multiple of source packets containing said data packets with corresponding added time stamps related to a time of arrival of said data packets. The pack header comprises data packet retrieval information, such as the number of new source packets in the stream pack and the effect of the start location of the first source packet in the stream pack. Preferably private stream 2 of the MPEG-format is employed for this new stream.

16 Claims, 19 Drawing Sheets

| Bit bx | Bit interval of bx | Wrap-around counter b0 .. bx |
|---|---|---|
| b9 | 11 usec | 22 usec |
| b15 | 711 usec | 1.4 msec |
| b19 | 11 msec | 22 msec |
| b23 | 182 msec | 364 msec |
| b27 | 2.9 sec | 5.8 sec |
| b31 | 46 sec | 92 sec |
| b35 | ~12 min | ~24 min |
| b39 | ~ 3 hr | ~ 6 hr |
| b43 | ~52 hr | ~ 104 hr |
| b47 | 35 days | 70 days |

Structure of S_PCK

| Field | Number of bits |
|---|---|
| Start_code_prefix | 24 |
| Stream_id | 8 |
| Application_id | 8 |
| Source_packet_length | 16 |
| Timestamp_length | 4 |
| Timestamp_clock_freq. | 4 |
| Start_offset_first_packet | 12 |
| Padding_position | 4 |
| Number_of_Start | 6 |
| DEMI | 2 |
| reserved | 3*8 |
| total | 14 Bytes |

FIG. 11

| Type of bit stream | Application_id |
|---|---|
| MPEG2 Transport Stream | tbd |
| MPEG2 Program Stream | tbd |
| DSS Transport Stream | tbd |
| DV | tbd |
| .......... | ... |
| Unknown | tbd |

FIG. 12

| Clock frequency | Bit value |
|---|---|
| 27 MHz (not locked to PCR) | 0001 |
| 27 MHz (locked to PCR) | 0010 |
| other | tbd |

FIG. 13

SOBI#k

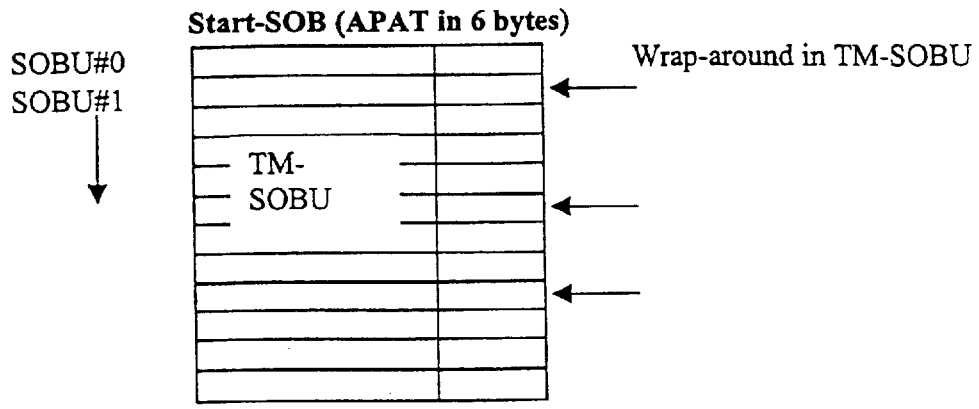
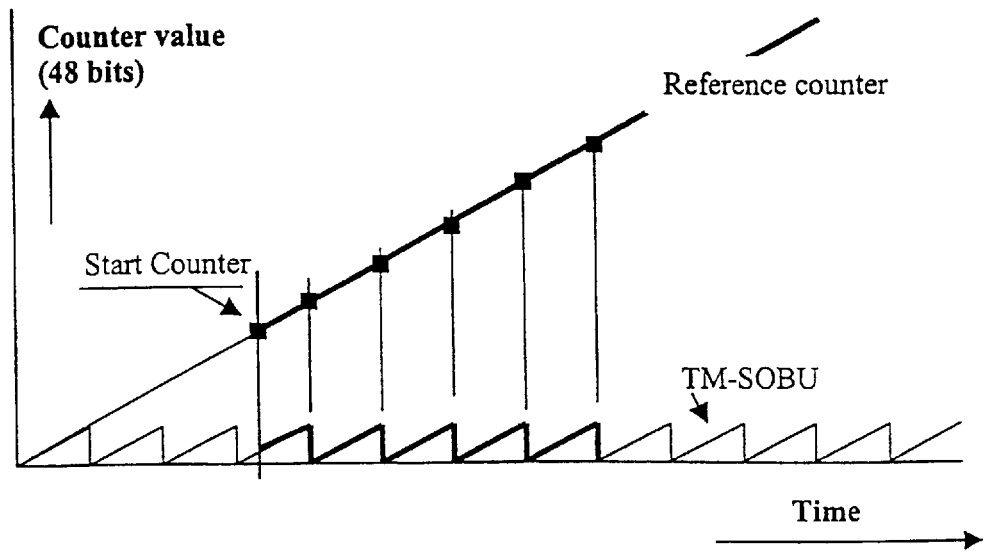
DRAM table with SOBU# of the wrap-around and the 4 MSB bytes of APAT
Size of the table:
  Wrap-around interval = 11 sec.
  Number of entries for one hour playing time ~360 (*8 bytes = ~2.6kbyte)
FIG. 16B

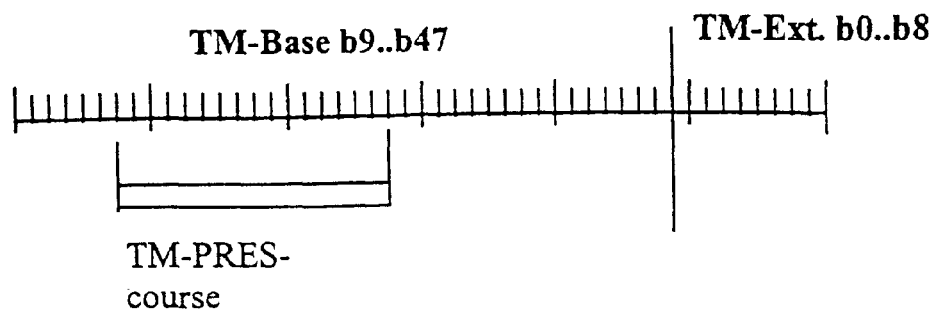
FIG. 22
SOBU-MAPL  PRES-MAPL
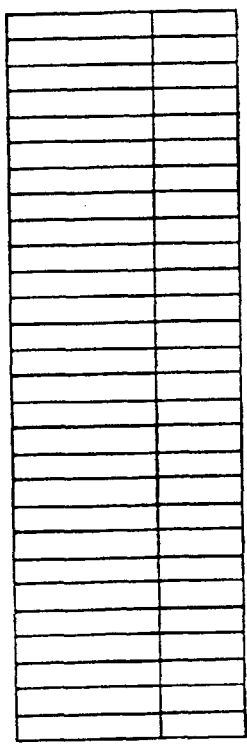
(2 bytes)
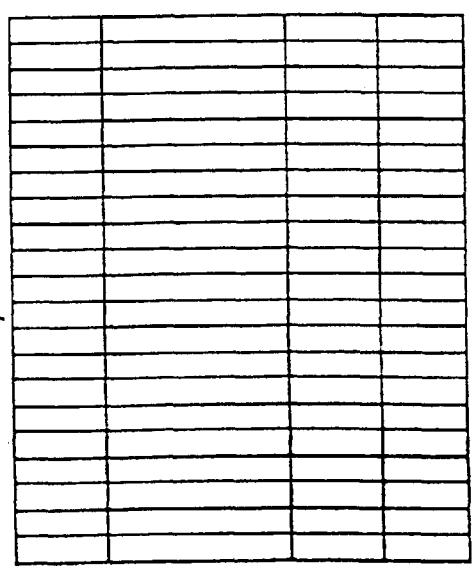
(4 bytes)
FIG. 23

METHOD OF STORING A REAL TIME STREAM OF INFORMATION SIGNALS ON A DISC LIKE RECORD CARRIER

FIELD OF THE INVENTION

The invention relates to a method of storing a substantially real time stream of information signals according to the preamble of claim 1 and a system for performing the method according to the preamble of claim 6.

BACKGROUND OF THE INVENTION

An apparatus for recording a real time information signal, such as an MPEG encoded video information signal on a record carrier is known for example from U.S. Pat. No. 5,579,183. The record carrier in the said document is in longitudinal form. For disc like record carriers a format for recording information signals is known from EP-A 814 475. This format, which will be referred to as the DVD-format, uses a Program Stream format for storing Program Elementary Stream Packets. A Program Stream comprises a Program Stream Header, a Program Elementary Stream Header, an Application Header and a Packet Payload of 1948 byte. Application Packets in a real time stream of information signals, such as for example Transport Packets in case of a MPEG stream, may be stored in the Packet Payload of the Program Stream Packets. Such a Transport Packet is 188 bytes long so that with a required additional Time Stamp of 4 bytes, only 10 times 192 bytes can be stored in one Packet Payload of 1948 bytes, leaving 28 bytes unused. In addition, the Program Stream Header and the Program Elementary Stream Header contain additional Time Stamps (SCR and PTS respectively) which are mandatory in MPEG. This leads to a reduced efficiency with respect to complexity and storage. Furthermore Application Packets in case of Digital Video (DV) are 480 bytes long. In the Packet Payload only 4 such Application Packets can be stored, also leading to unused bytes. Further kinds of Application Packets are found for example with the ATM format. Therefore, it can be said in general, storing Application Packets in the Packet Payload of a Program Stream may lead to a reduced efficiency.

An object of the invention is to overcome the above mentioned disadvantages and more generally to overcome the problem of storing application packets from a real time stream on a disc like record carrier.

SUMMARY OF THE INVENTION

The invention aims at providing measures to enable the various requirements, such as the ones described above. In accordance with the invention, the method is characterized by the characterizing part of claim 1.

Inserting data packet retrieval information enables flexible storage of the data packets in a stream pack, independent of the size of the data packet. This enables a more efficient way to store data packets compared with storing said data packets in the packet payload of a program stream according to the MPEG format, as specified in IEC/ISO 13818-1 and IEC/ISO 138180-2, which does not allow configuration information.

A preferred sized of the stream pack is 2048 byte, being the unit of recording of recordable or rewritable optical disc type record carriers such as CD-R/RW, DVD-R/RW.

An advantageous method is obtained by defining the first bytes of a stream pack according to claim 3. This definition corresponds to the mandatory bytes according to the MPEG format for allowable so-called private streams. With respect to these private streams, less bytes are mandatory in comparison with a normal MPEG Program Stream. Adapting to a MPEG system format by employing private streams, has the advantage of compatibility with current standardized formats for optical discs such as DVD-R/RW.

A further advantageous method is obtained by the method according to claim 4. Private stream 2 of the MPEG format is less bound to restrictions then private stream 1, leaving more space available for storage of data packets.

An advantageous method of storing data packet retrieval information is obtained by the method according to claim 5. Shifting the start of a first new source packet within a stream pack, allows storing the remaining part of the last source packet within a preceding stream pack.

DESCRIPTION OF PREFERRED EMBODIMENTS

These and other aspects of the invention will be apparent from and elucidated with reference to the embodiments hereafter in the figure description, in which FIG. 1 shows an apparatus for streaming a real time stream of information signals onto a disc like record carrier;

FIG. 11 shows the contents of the Pack Header;

FIG. 12 shows examples of types of bit streams;

FIG. 13 shows the bit values specifying the clock frequency;

FIG. 22 shows a course time stamp of the presentation mapping list (TM-PRES-Course);

FIG. 23 shows the size of the Stream Object Unit and Presentation Mapping List tables (SOBU-MAPL and PRES-MAPL);

DESCRIPTION

Figure 1:
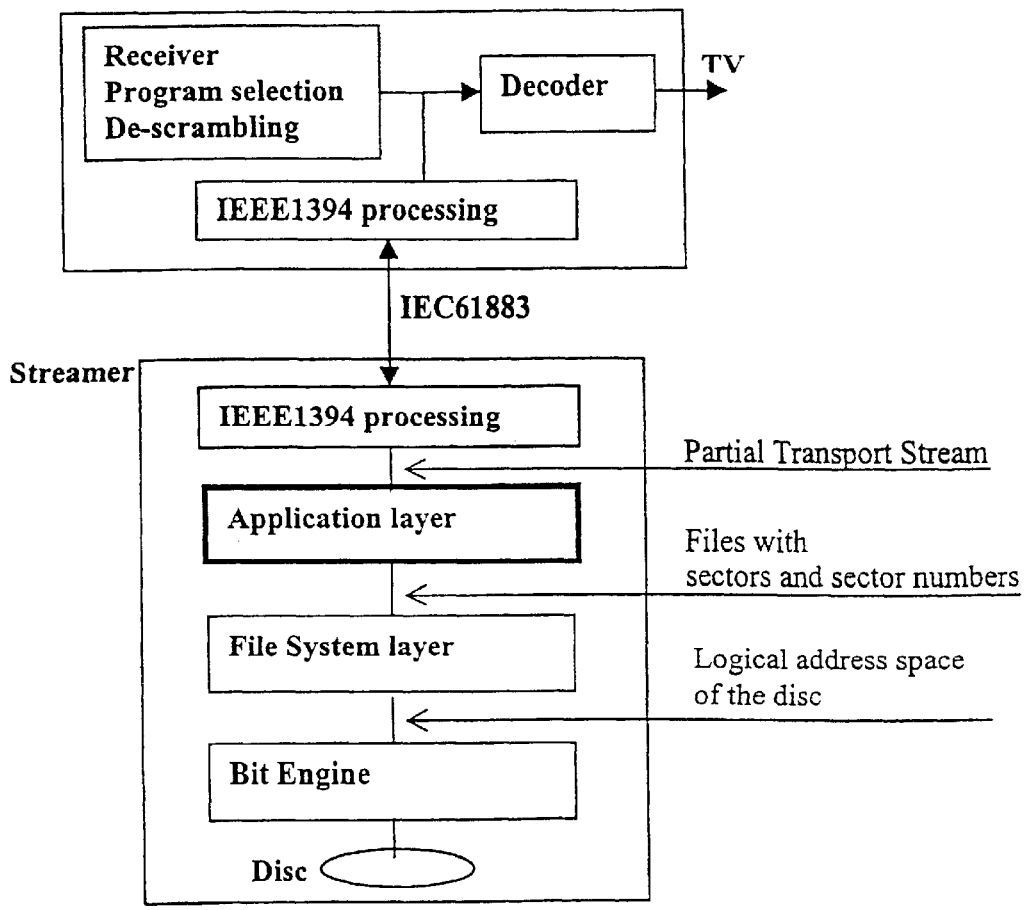

FIG. 1 shows an apparatus for streaming a real time stream of information signals onto a disc like record carrier. The Set Top Box (STB) for receiving Digital Broadcast is merely an example of a source of real time information signals. Another source is for example a DVD-playback device.

The application processing in the Streamer might consist of time stamping of the Application Packets [mandatory], mapping of Application Packets onto sectors [mandatory], creating and handling of the STREAMER.IFO file [mandatory], parsing the input stream and deriving Presentation timing [optional], handling service information of the input stream [optional] and editing, entry points, text, info, . . . [optional]

The file system maps the input files on the logical address space of the Bit Engine while the record and retrieves data from the disc.

Figure 2:
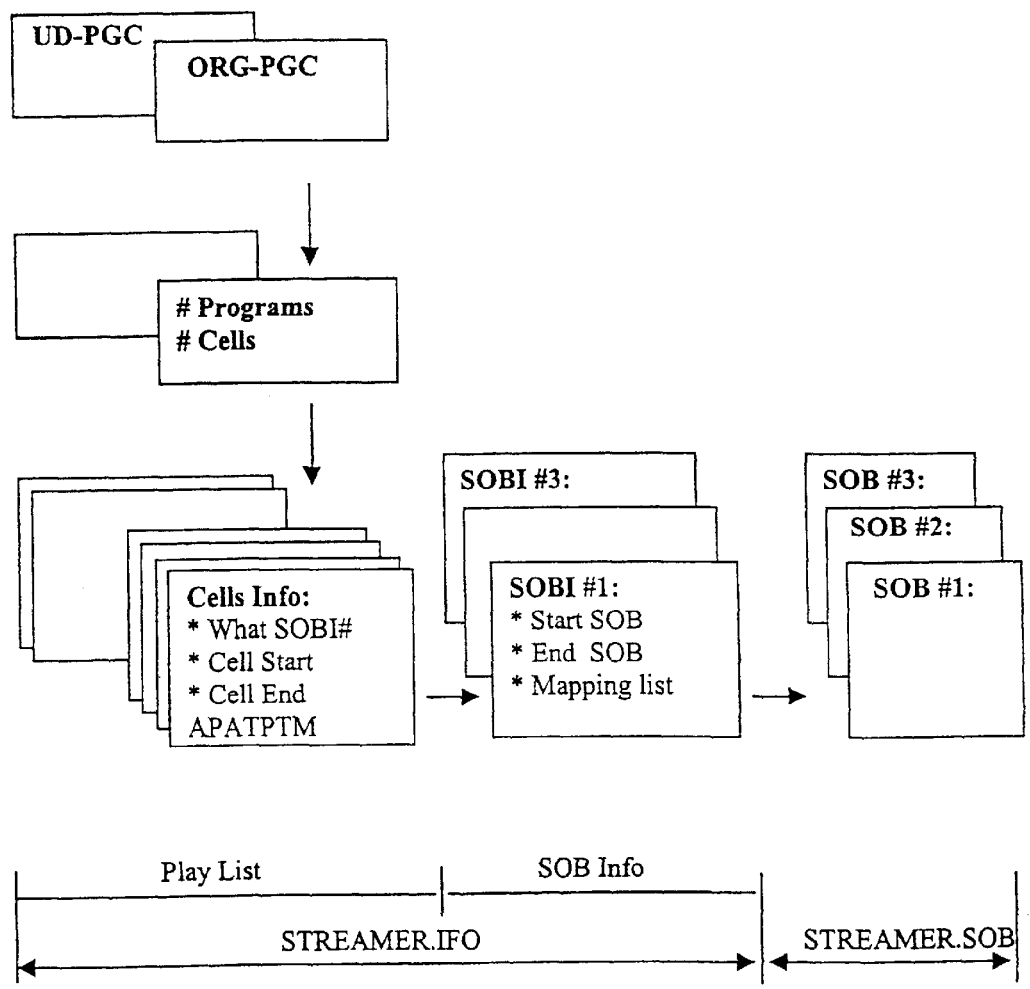
FIG. 2 shows the organization of Streamer Data and Navigation Data on a disc.

FIG. 2 shows the organization of Streamer Data and Navigation Data on a disc. In particular the Streamer Files are denoted in relation with the organization of data according to the DVD-format with a User Defined Program Chain (UD-PGC) and an Original Program Chain (ORG-PGC). The Cells Info indicating which Stream Objects (SOBs) have to be played (Play List), while the Stream Object Information (SOBI) containing the address of each Stream Object. The video or audio data itself is contained in Stream Objects (SOB).

The Input signal of the Application layer is a Real-Time data stream (e.g. a Partial Transport Stream). The output signal of the Application layer to the File System are two files (like in the RTRW system), one containing the stream data (STREAMER.SOB file and the other containing the Navigation data (STREAMER.IFO file).

Figures 3, 4:
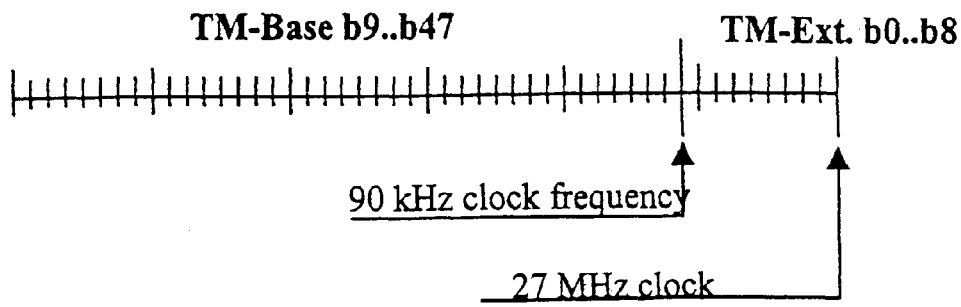
FIG. 3 shows the format of the Reference Time Base Counter.
FIG. 4 shows a table giving the weight of the bits of the Time Reference Base Counter.

FIG. 3 shows the format of the Reference Time Base Counter. All used timestamping methods do use bits from the 6 byte Reference Time base counter. The clock frequency of the counter is 27 MHz. First the 27 MHz is divided by 300. These bits are represented in TM-Ext b0 . . . b8 (9 bits). Bit b8 represents a clock frequency of 90 kHz. This 90 kHz clock frequency is used in the next counter. Here the bits TM-Base b9 . . . b47 are determined. This counter spans an interval of ~70 days.

The table in FIG. 4 gives the weight of the most important bits for time stamping on the time axis is given. It is remarked hereby that in MPEG2 the PCR, SCR, PTS and DTS are represented in this format with:

PCR=>b41 . . . b0 (42 bits)

SCR=>b41 . . . b0 (42 bits)

PTS=>b41 . . . b9 (33 bits)

DTS=>b41 . . . b9 (33 bits)

At the Input and Output of the Streamer Device the streamer data consists of a number of Application Packets, which might arrive with irregular intervals between the packets. The Application Packet Arrival Time (APAT) is represented with the 6 bytes of the Reference counter.

Figure 5A:
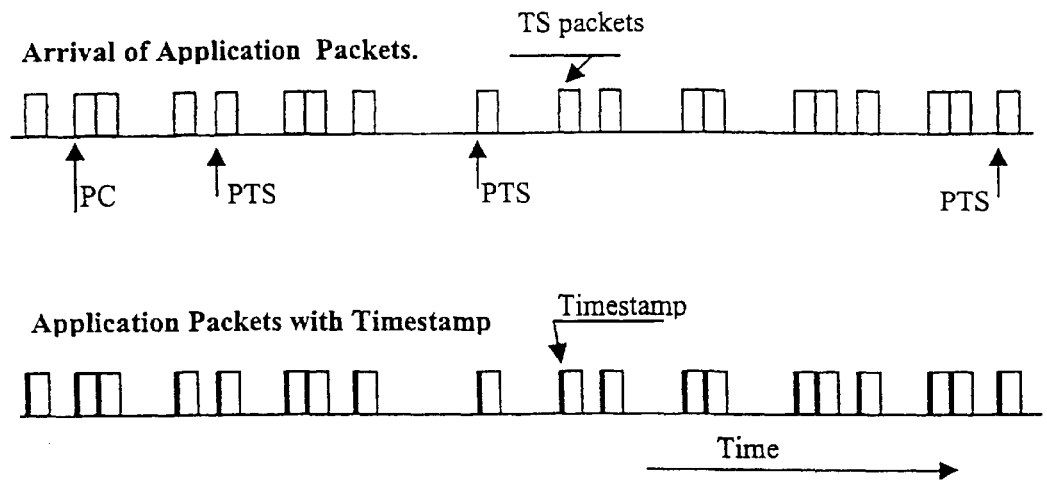
FIG. 5A shows an example of Stream Data in case of a MEPG-2 TS.

FIG. 5A shows an example of Stream data in case of a MPEG2 Transport Stream.

Some of the packets do have a PCR timestamp and some of them do have a Presentation Timestamp (PTS) or Decoding Timestamp (DTS) for the corresponding access unit (Video, Audio, Sub-picture). The PCR can be used to derive the 27 MHz system clock (PLL locked to PCR).

Figure 5B:
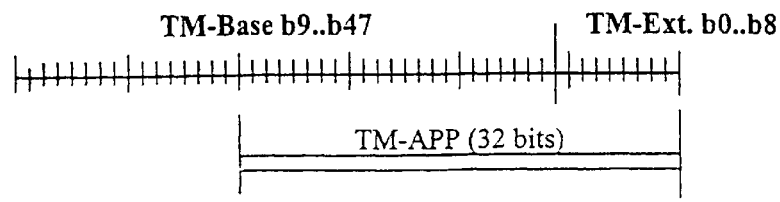
FIG. 5B shows time stamping of Application Packets.

At the output of the Streamer Device the relative positions of the Application packets should be restored. For this purpose a Timestamp is inserted in front of all Application packets. Not all of the APAT bits are used in the Timestamp (TM-APP) as is illustrated in FIG. 5B.

In case the size of the timestamp is 4 bytes (as is proposed for MPEG2-TS recording) the bits b0 . . . b31 are used. With 4 bytes an interval of ~90 seconds can be represented.

Figure 6:
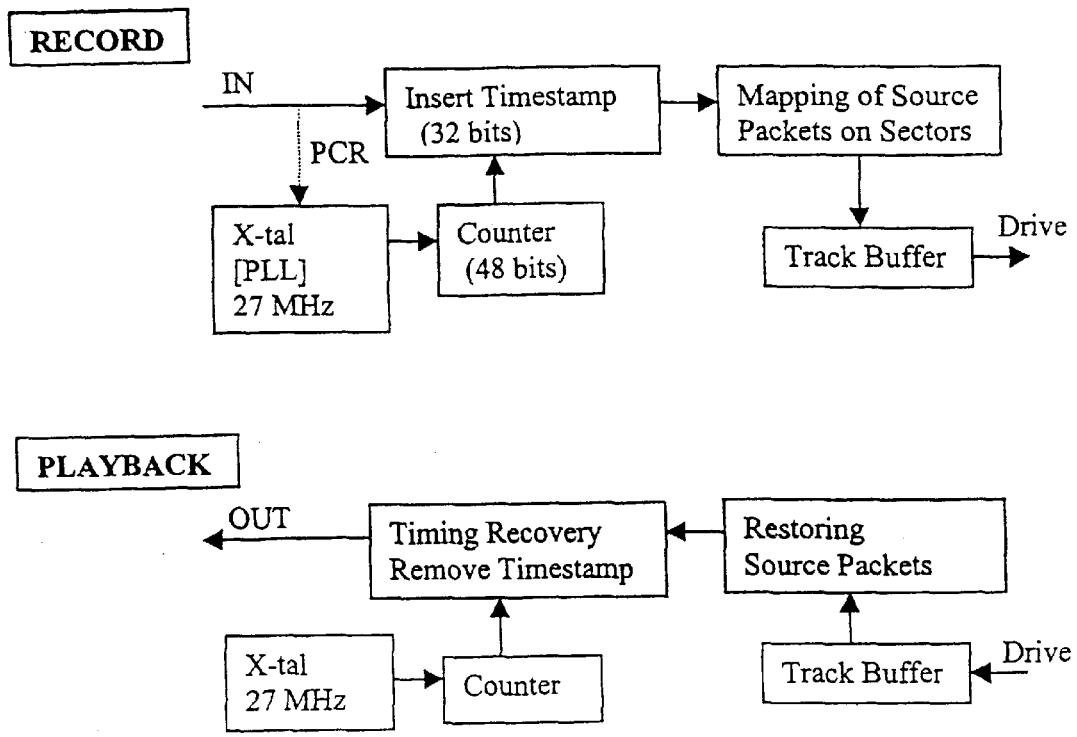
FIG. 6 shows an example of time stamping and recovery in a streamer.

FIGS. 6 show an example of timing recovery in the Streamer. During Record the Timestamp is derived from the Counter position of a 27 MHz counter. In case of a MPEG2 TS preferably the clock frequency is locked to the PCR of the TS. During Playback the counter value is compared with the Timestamp value. As soon as both are equal, then the Application packet is put to the output. There should always be enough data in the Track buffer.

Figure 7:
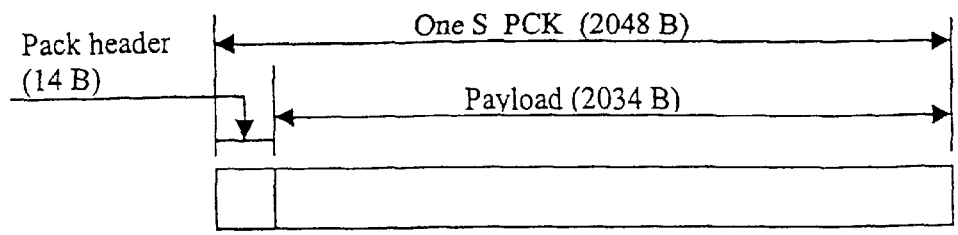
FIG. 7 shows the structure of a Stream Packet (S_PCK)

All Application packets that are continuously recorded are organized in a Stream-Object (SOB). Within a SOB the 6 Byte Reference counter from which the timestamp is derived, counts continuously without any reset and/or wraparound. The Application packets of a SOB are packed into a sequence of "Stream packs" called S_PCK or sector. This is illustrated in FIG. 7. The length of the Stream packs is 2048 bytes. The Stream packs do have a header of 14 bytes and a payload of 2034 bytes. The payload consists of Source packets and if needed some padding bytes.

Figure 8:
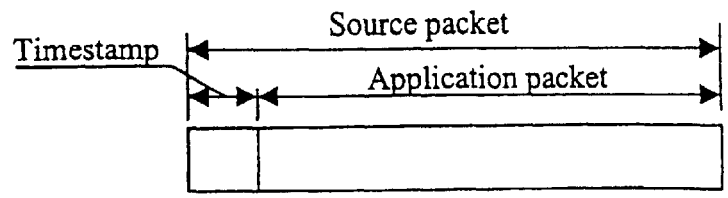
FIG. 8 shows the structure of a Source Packet.

FIG. 8 shows the format of a Source packet. The Source packets consist of Application packets of 188 bytes in case of a MPEG TS packet with in front (if present) a Timestamp (TM-APP) of 4 bytes. The total Source Packet length is 192 bytes.

Figure 9:
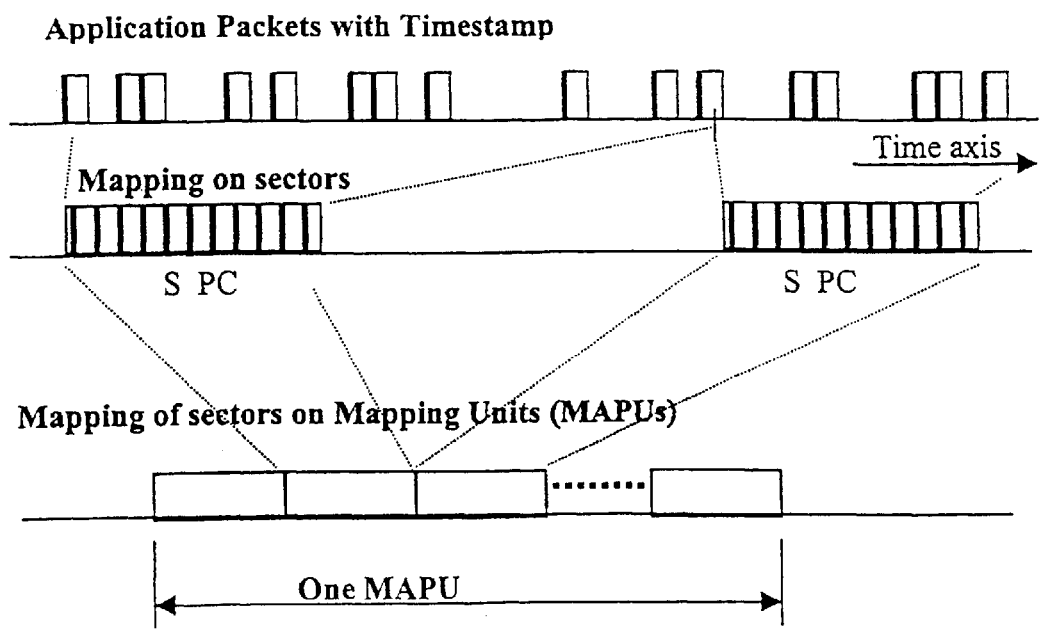
FIG. 9 shows mapping of Application Packets on Stream Packets and mapping of Stream Packets on Mapping Units (MAPUs)

FIG. 9 shows the mapping of Application Packets on S_PCKs and mapping of S_PCKs on MAPUs. A number of S_PCKs are collected in an ECC block on the disc. The size of the ECC block is used as the Mapping Unit (MAPU). The Source packets are aligned with the first S_PCK in a MAPU. Padding in the S_PCKs is allowed and sometimes needed. It is noted that access to the information on the disc is based on ECC blocks. The mapping of the ECC blocks on the disc is carried out by the File system. In the Application Layer it is known which S_PCKs are collected in one ECC block. The number of sectors per ECC block depends on the drive with DVD-R/RW 16 sectors per ECC block, DVD-RAM 16 sectors per ECC block, DVD+RW and 16 sectors per ECC block. In next generations it is expected that the ECC block size increases.

Figure 10:
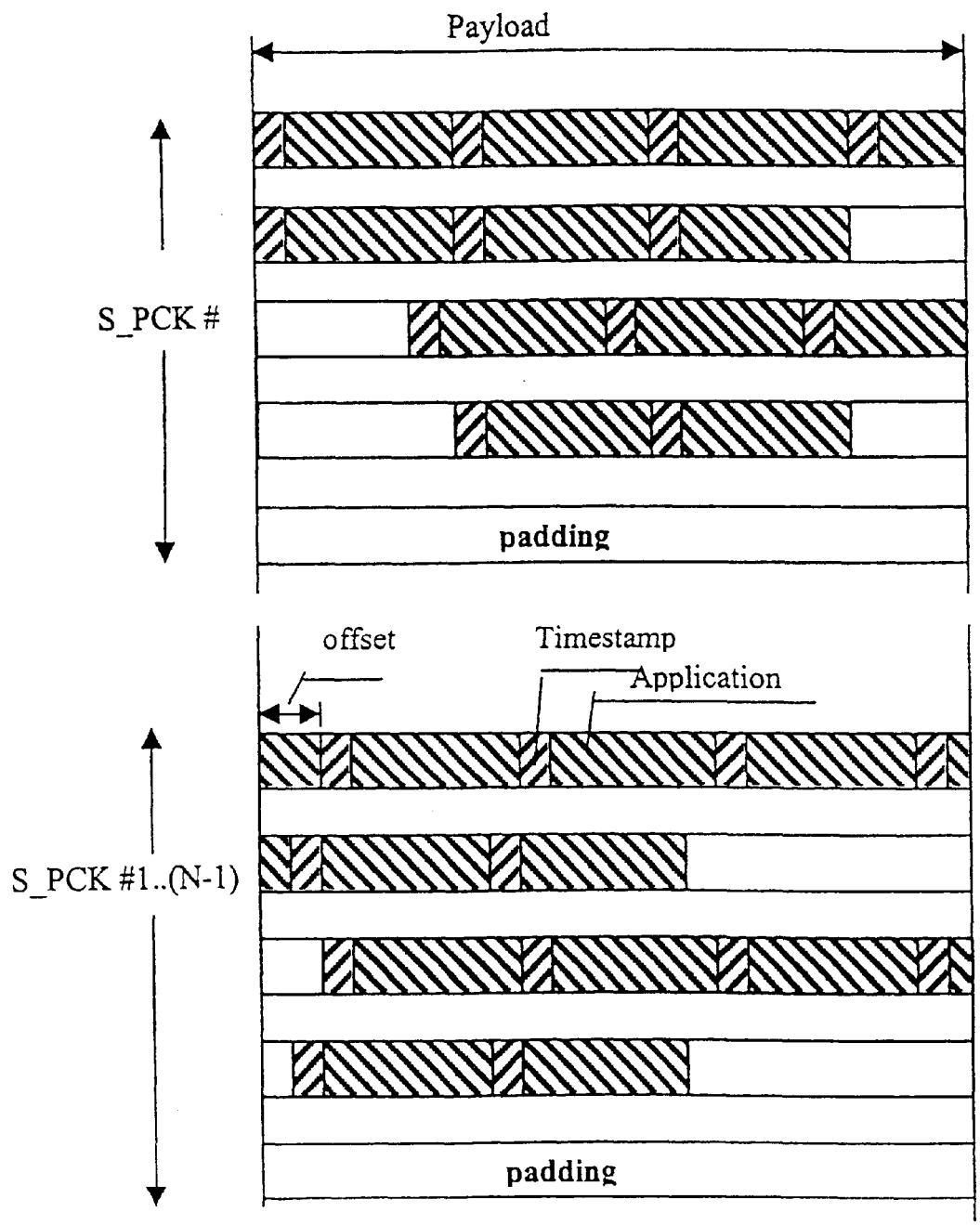
FIG. 10 shows examples of filling the Stream Packets with Source Packets.

FIG. 10 shows examples of filling the S-PCKs with Source packets. The MAPU contains N S_PCKs. Padding bits may be at the end (second row), at the begin (third row) and at both the begin and end of a S-PCK (fourth row) or a S_PCK may contain only padding bits (fifth row). The first S_PCK always starts with a new Source packet (first row). Further a S-PCK may end with a non complete Source Packet (first and third row). After padding bits, always a new Source packet follows. It is remarked that padding is not needed for an MPEG TS and 32 S_PCKs per MAPU. Then exactly 339 TS packets do fit in one MAPU. Padding is applied if the Source packets do not fit anymore in the last S_PCK of the MAPU or at the end of SOB. The SOB is finished with a complete MAPU. More than one S_PCK might be filled with padding bytes.

FIG. 11 shows the content of the Pack header. The several fields of which will be discussed hereafter.

The Start_code-prefix is 000001h. It is remarked that MPEG devices identify only the first four bytes of a PS header while a complete DVD header contains 14 bytes.

The Stream_id for streamer formats is to be defined. This stream_id indicates that the formatting is according the streamer specification. There are two possibilities for the Stream-id:
a] 1111 1110=>Number reserved for data stream [1111 xxx0]
b] 1011 1111=>Private_Stream_2
It is remarked that a Private_Stream_1 is subject to more restrictions contrary to a Private_Stream_2. For example in case of MPEG, all stream IDs in a Private_Stream_1 are already defined.

The Application_id indicates what type of bit stream is recorded. See FIG. 12. Eventually this ID may alternatively be present in the SOB-GI.

The Source_packet_length specifies the length in number of bytes of the Source packet (including the Timestamp). The number 0 is not allowed. This may alternatively specified in the SOB-GI.

The Timestamp_length specifies the length in number of bytes of the Timestamp. The position of the Timestamp is in front of the corresponding packet. Again, instead of the Pack header, this may be specified in the SOB_GI.

The Length 0 indicates that there is no Timestamp present.

The Timestamp_clock_frequency specifies the reference clock frequency of the timestamp. The table shown if FIG. 13 is used.

The Start_offset_first_packet indicates the position of the first byte of the first application packet in the S_PCK. The byte position is given in number of bytes starting at 0 at the first byte of the S_PCK. Source packets need not be not aligned with S_PCKs. Start positions are given in bytes w.r.t the beginning of S_PCK. A start-offset=14 means that a Source packet starts at the beginning at payload, while start-offset=0 . . . 13 means that there is no beginning of a Source packet.

The Padding_position indicates the position of padding bytes in the S_PCK. As an example in case padding is allowed at the beginning of the S_PCK:
0000=>No padding
0001=>Padding at the start of the S_PCK
0010=>Padding at the end of the S_PCK
0011=>Padding at both start and end of the S_PCK
0100=>Only padding in this S_PCK.
Strictly speaking the 0100 state is not needed (Padding at both start and end while Number-of-Start-Source-packets=0 means that only padding bits occur in the sector.

The Number_of_Start_Source-packets indicates the number of beginnings of a Source packet in the S_PCK. With the offset_start_position, the number_of_starts and the Length_Source_packets it is simple to derive the start position of the padding bytes.

The Timestamp_clock_freq., the Sart_offset_first_ packet, the Padding_position and the Number_of_Start field may be specific each sector and should therefore be present in the Pack header.

The DEMI (Disc Encryption Mode Indicator) represents the updated EMI bits from the 5C-DTDG proposal. Note: A non-cognizant streamer takes only the EMI bits from the IEEE1394 bus header in account for Copy Control. These bits (updated to the new situation) must be stored.

Figure 14:
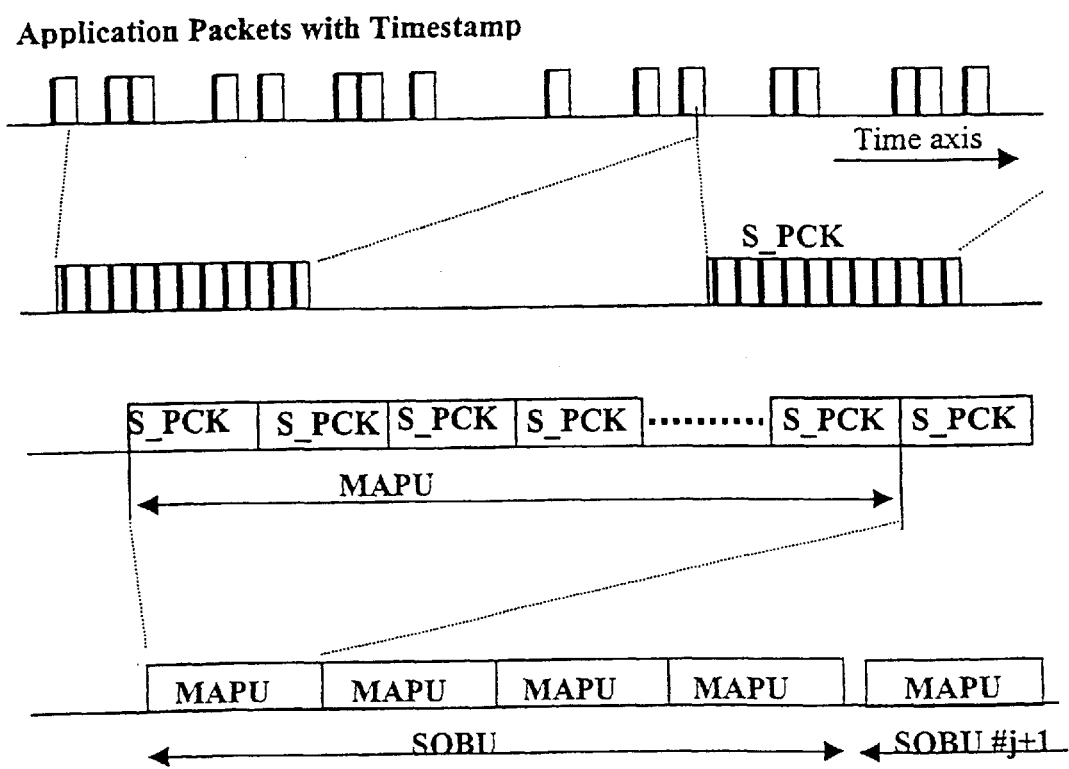
FIG. 14 shows the creation of Stream Object Units (SOBUs)

FIG. 14 shows the creation of SOBUs. In the SOB the Application Packets are mapped on S_PCKs. In the SOBI table a Mapping Table is used which maps the Time axis on the relative position in the SOB. For this purpose the SOB is subdivided in Stream Object Units (SOBUs). The SOBU might be compared with the VOBU in the RTRW specification. In the VOBU the position of the GOP in the data file can be calculated. With the SOBI table the position of the SOBUs in the STREAMER.SOB file and their relative timing with respect to the beginning of the SOB, can be reconstructed. A SOBU contains an integer number of MAPUs. Note that every SOBU starts with an Timestamp of an Application Packet. The maximum number of sectors per SOBU is 64. The maximum number of MAPUs per SOBU is 4 in case MAPU size is 16 sectors and is 2 in case the MAPU size is 32 sectors. It is remarked that a SOBU is equal to an integer amount of ECC-blocks.

Figure 15:
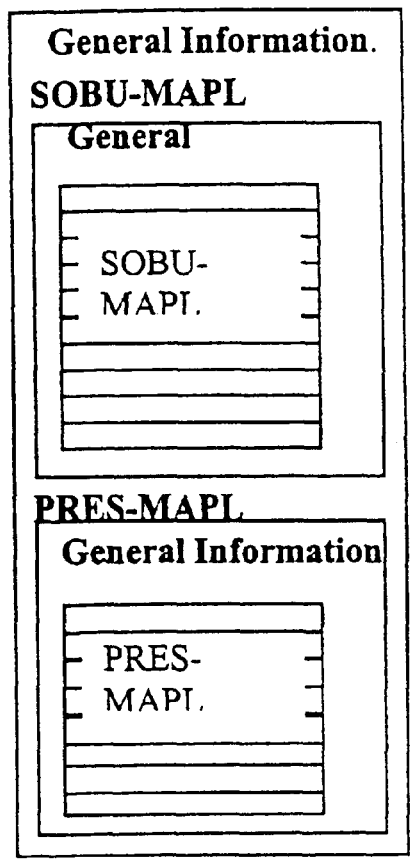
FIG. 15 shows the content of Stream Object Information (SOBI)

From the SOBU mapping table in the SOBI we can find the relation between playing time and location of the data in the STREAMER.SOB file. The SOBI#k table has the following structure as shown in FIG. 15. The SOBU-MAPL contains the mapping of Arrival times of Applications packets (TM-SOBU, first 10 bytes of an entry) on the Reference time axis. As the number of sectors is constant within the SOBU, it is simple to derive the relation between Application packet arrival time and the location in the stream file (TM-Sector, last 6 bytes of an entry) Each SOBU has an entry in the table. In the PRES-MAPL (which is optional) the presentation time of an access unit points to the corresponding SOBU number. In this way the relation between Presentation time and location in the stream file can be found. The optional PRES-MAPL is advantageous in case MPEG. As a PTS is not present in a MPEG stream, delays in presentation will occur with for instance trick-play. With a PRES-MAPL table this can be avoided.

The SOBI#k General Information contains parameters which are constant for the whole SOB#k. The General Information of SOBI#k contains the MAPU size (in sectors, e.g. 16 or 32) and the SOBU size (in MAPUs, e.g. 16 or 32).

Every SOBU-MAPL entry consists of 2 fields: a TM-SOBU (10 bits) and a TM-Sectors (6 bits).

The SOBU timestamp (TM-SOBU) is part of the APAT of the first application packet from the SOBU. This illustrated in FIG. 1 6A. The TMU shift is constant for SOBUs in the SOB. TMU-shift is mentioned in the General information of SOBU-MAPL. TMU-shift should be chosen in such a way that:
The wrap-around interval of TM-SOBU is larger than the maximum interval of a SOBU. Otherwise an ambiguous value would result.
TMU-shift<23 Together with the TM-APP no bits of the APAT are missing (except for the MSS). This is required to restore the absolute time reference.
The resolution on the time axis is high enough. No succeeding SOBUs with the same number for TM-SOBU are allowed.

Figure 16A:
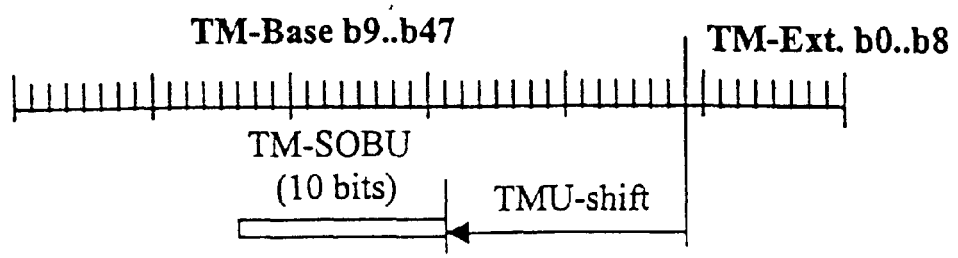
FIG. 16 shows a time stamp of a Stream Object Unit (TM-SOBU)
Figure 17:
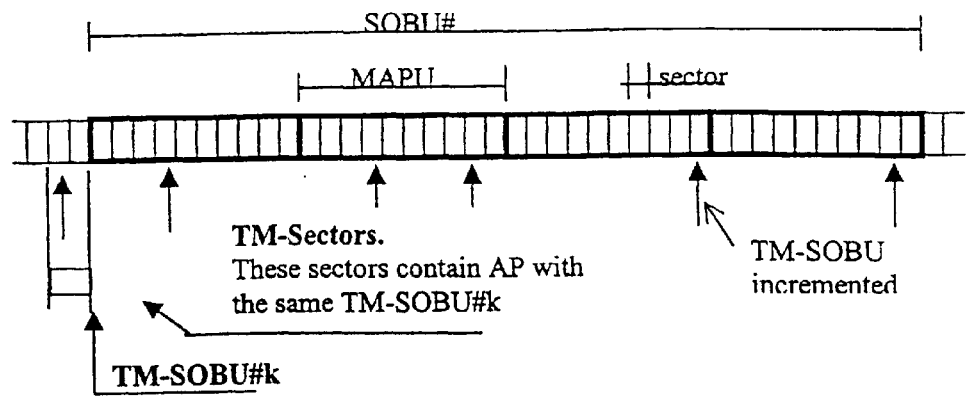
FIG. 17 shows a time stamp of a Sector (TM-Sector)

FIG. 16B shows an example how to implement the absolute time base. FIG. 17 shows the TM-Sectors. In the TM-SOBU part of the APAT of the first Application packet is mentioned. In the previous SOBU there might be some application packets for which the same TM-SOBU is valid. Resolution in location of this SOBU in the SOB is improved by using a second field in the SOBU entry with the number of sectors in this and previous SOBU, which contain Application packets from which the same TM-SOBU is derived. This improves the access time.

Figure 18:
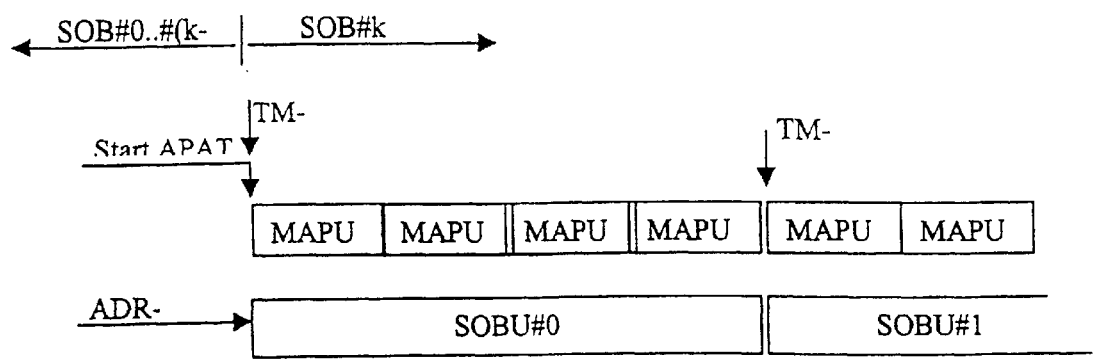
FIG. 18 shows the content of the General Information for a Stream Object Unit Mapping Table (SOBU_MAPL)

The General Information for the SOBU-MAPL contains: a TMU shift, Start APAT, End APAT, ADR-OFS, Number of MAPUs in the first SOBU, Number of MAPUs in the last SOBU and the Number of entries. This is illustrated in FIG. 18 and discussed briefly hereafter:

Start APAT: APAT of the first application packet which is relevant for the SOB.

After partial deleting of the SOB, the first application packet of the SOB need not be at the beginning of the SOBU.

End APAT: APAT of the last application packet which is relevant for the SOB. The last SOBU of the SOB need not have the SOBU-size of MAPUs. Data is recorded in MAPUs. The last MAPU might have a number of padding sectors.

ADR-OFS: Number of sectors of the previous SOBs. Number of MAPUs in the first SOBU. After partial deleting, the first SOBU might have less MAPUs than indicated in the SOBU size.

Number of MAPUs in the last SOBU. The last SOBU might have less MAPUs than indicated in the SOBU size.

Figure 19:
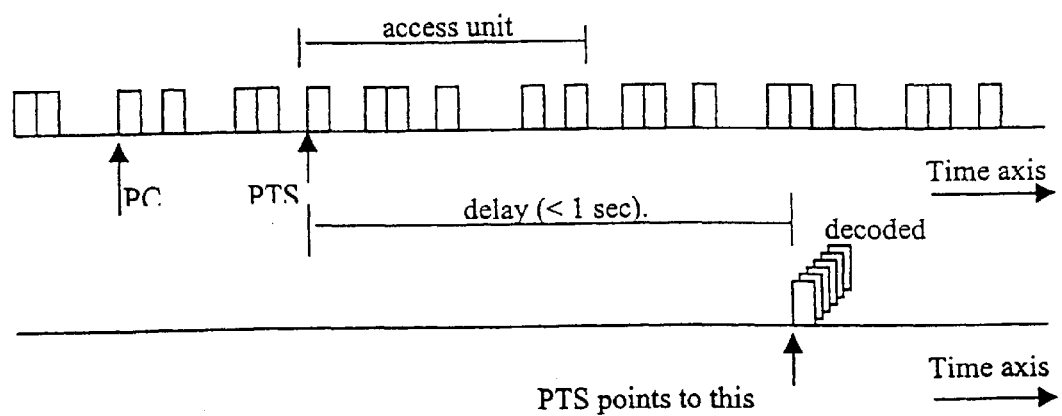
FIG. 19 shows a time stamp for presentation (TM-PS)

The presentation Timestamp (TM-PTS) will be discussed with reference to FIG. 19 which illustrates a MPEG2 Transport Stream.

In the MPEG decoder the PCR in the TS is used to derive the Reference timebase (TM-base+TM-ext) of the decoder. The PTSv indicates the moment when the Video access unit which is indicated by this PTS should be presented. There will be a delay between the arrival time of the TS packet which contains the PTS and the moment this application packet must be decoded. PTS is always pointing to the future. The maximum delay is ~1 sec.

For some features an accuracy of 1 second is not enough (editing, trick play, . . . ) That is why a separate entry is made in the mapping table. In this sub-table the mapping of presentation times is listed. The MPEG2 TS is parsed. The TS packets with the PTS from an I-picture (start of the GOP) are searched. In the PRES-MAPL tables these PTS values and the pointers to the corresponding SOBU are listed.

The PRES-MAPL table contains following fields: Presentation time (TM-PRES), Corresponding SOBU number (SOBU-PRES), Corresponding sector in the SOBU (Sector-PRES) and Number of sectors of the I-frame (Sector-I-frame).

Figure 20:
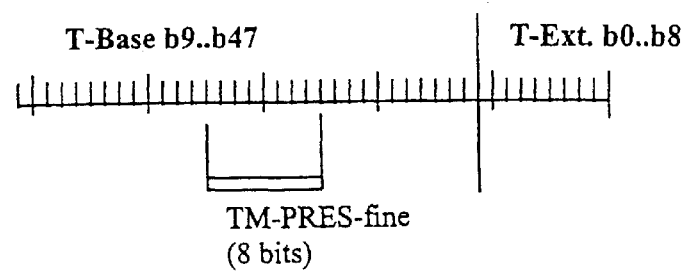
FIG. 20 shows a time stamp of the presentation mapping list (TM-PRES)

The Timestamp of the Presentation mapping list (TM-PRES) is shown in FIG. 20.

The resolution of TM-PRES-fine should be less then the frame period of a picture. The wrap-around of TM-pres timestamp should be >1 sec (maximum delay between Arrival time and PTS. Resolution of the TM-PRES is taken 22 msec (TM-base b20). From the reference counter the bits b20 . . . b27 are used. The wrap-around is >5.6 second which is sufficient even if a number of GOPs is skipped in the list.

The SOBU-PRES is represented in 10 bits. The wrap-around numbering for the SOBU in the PRES-MAPL is 1024.

The Sector-PRES (6 bits) gives the sector number in the SOBU which contains the PTS is given.

The Sector-Iframe (8 bits) gives the number of sectors which contain I-frame data from the corresponding PTS.

The General Information for the PRES-MAPL in SOBI#k contains a PTS first Application Packet and an Offset in SOBU numbering. The PTS value is used to find the start-offset in the Reference counter. In the PRES-MAPL absolute numbers are used for the SOBU numbers. After partial deleting the numbers get an offset. This number is mentioned in the general information for this table.

Figure 21:
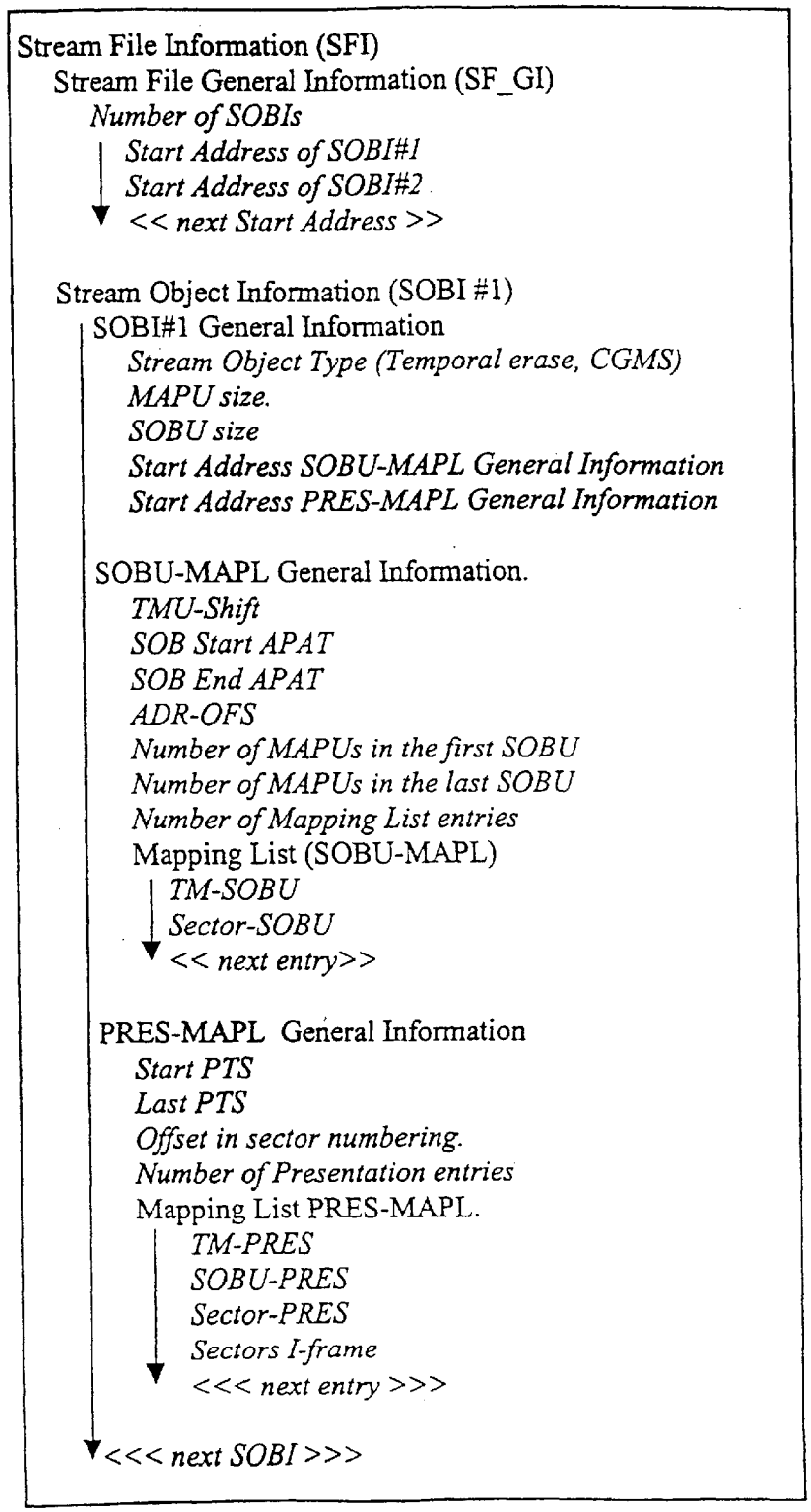
FIG. 21 shows the content of the STREAMER.IFO tables.

FIG. 21 shows the contents of the STREAMER.IFO Tables. All non-relevant (for Navigation) fields are omitted. Only the Stream File Information Table (SFIT) is explained. Only Italic items represent data entries.

Next an example of default settings for Broadcast recording of Transport Streams [MP&ML] Partial TS is given.
Transport Stream (application) packet size 188 bytes.
Average bit rate most probably ~6 Mbps. (averaging interval ~0.5 sec).
MAPU size: 16 S_PCKs are mapped on one ECC block.
SOBU size: 4 MAPUs (1 SOBU=128 kByte)
6 Mbps=>SOBU interval is ~166 msec
Number of SOBU entries per disc (4.7 GB)=>40.000
MTU-Shif=10.
Resolution of the Time stamp (TM-SOBU) counter is 11 msec.
The wrap-around time interval is 11.6 seconds.

It is noted that while reading the SOBI data in memory it is simple to reconstruct the complete APAT. The start APAT is given in the SOBI general information, the wrap-arounds can be detected. For a 3 hour recording there are only 1000 wrap-arounds.
The maximum bit rate corresponds with 128 kbyte in 11 msec which is ~100 Mbps.
The minimum bit rate corresponds with 128 kbyte in 11 sec which is ~100 kbps.
With respect to the PRES-MAPL:
Playing time for 4.7 GB disc and 6 Mbps input rate: 104 minutes. (6251 sec)
GOP length (assumed) 0.4 sec. Number of entries in the table 15628

It is noted that at the Input and Output the duration of a SOBU is >100 msec. This SOBU can be read from disc in less than 100 msec. This should be acceptable in relation to the Jump time of ~1 sec and the maximum delay (1 sec) of PTS w.r.t. the APAT.

For fast access the PRES-MAPL should be used. This mapping is accurate (sector number). In situations where fast access is needed while there is no PRES-MAPL, then the SOB-size is taken 2 MAPUs (or 1 MAPU).

Next an example is given how access time can be improved by storing an additional table in DRAM. The table contains the absolute SOBU numbers and full Presentation time. This additional table (called PRES-MAPL-Course) has 2 entries: TM-PRES-Course (16 bits) and SOBU-PRES-Course (32 bits)

FIG. 22 illustrates the TM-PRES-course. The wrap-around TM-PRES-Course should be larger than the duration of a program. The resolution of TM-PRES-Course should be smaller than the wrap-around in the TM-PRES entry.

The number of SOBUs on a disc can be very large. The minimum size of a SOBU is 16 sectors and the maximum number of sectors per disc (4.7 GB) is 2.4 M. and the number of SOBUs per disc is 150 k. 18 bits are needed to point to a particular SOBU on the Disc. 32 bits are reserved for SOBU-PRES-course.

There should be an entry for every wrap-around in the SOBU-PRES number (every 1024 SOBUs). For the MPEG TS recording in 4.1 there are 37 600 SOBUs on the disc. So there are needed only 40 entries in the table. The size of this table can be neglected (~240 bytes).

FIG. 23 shows the size of the tables.

With respect to the SOBU-MAPL table: the default value for a SOBU size is 64 sectors (128 kbyte). On the 4.7 Gbyte disc there fit 37 600 SOBUs and the size of the SOBU-MAPL is then ~80 kbyte.

With respect to the PRES-MAPL table: expecting a playing time of 3 hrs on the disc and a GOP duration of 0.5 sec then the number of entries in the table is 21 600. The size of the PRES-MAPL-fine is then ~80 kbyte.

Figure 24A:
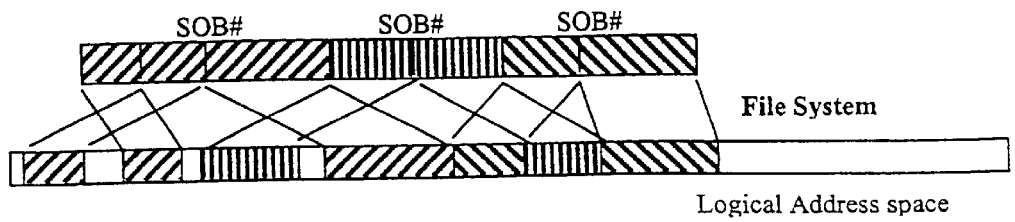
FIG. 24 shows deleting a complete Streamer Object.
Figure 24B:
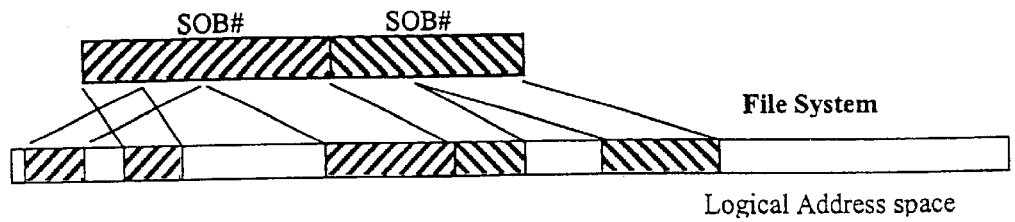
Figure 25A:
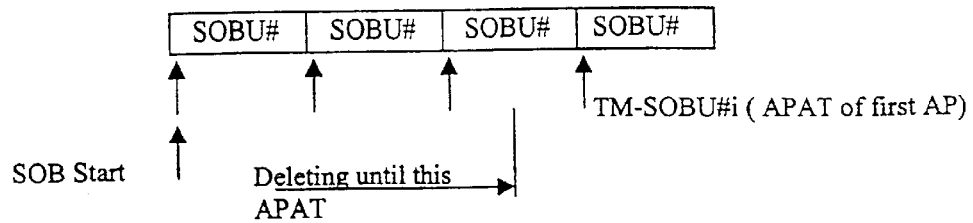
FIG. 25 shows deleting part of a Streamer Object using STREAMER.IFO only.
Figure 25B:
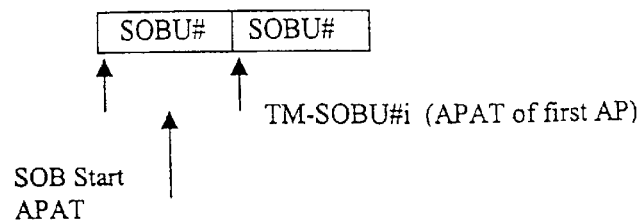

Next deleting of a complete SOB will be explained. In the Streamer. SOB file the SOB is removed which means that after removing the SOB from the file all addressing in other SOBs with a higher number are modified. The File system changes the mapping to the Logical address space . . . FIG. 24A illustrates a Streamer. SOB file before deleting while FIG. 25B illustrate the Streamer. SOB file after deleting.

In the SOBI#2 (SOBI#3 before deleting) the ADR_OFS is changed in the SOBI#2 General information. All other information in the SOBI table can be kept the same. The File System has to take care that the last part of the STREAMER.SOB file (SOB#2 is previous SOB#3) points to the correct locations in the Logical address space. Next the deleting of a part of a SOB will be explained. Two methods are described: a first method when the Streamer does not know the content (using STREAMER.IFO only) and a second method when the Streamer understands the application data and parses the stream.

First, the first method, using STREAMER.IFO data only, will be explained with reference to FIGS. 25A (showing the situation before partial deleting of a SOB) and 25B (showing the situation after partial deleting a SOB).

The beginning of the SOB is deleted. In the application layer of the streamer it is decided where the beginning of the partly deleted SOB should start. Without looking in the stream data, the application layer has only information on the start of a SOBU. If the start position is in-between two entry points in the mapping table then the new SOB starts with the lowest numbered SOBU. All entry points with a lower APAT are removed from the table.

The same strategy is used when removing the end of the SOB.

Figure 26A:
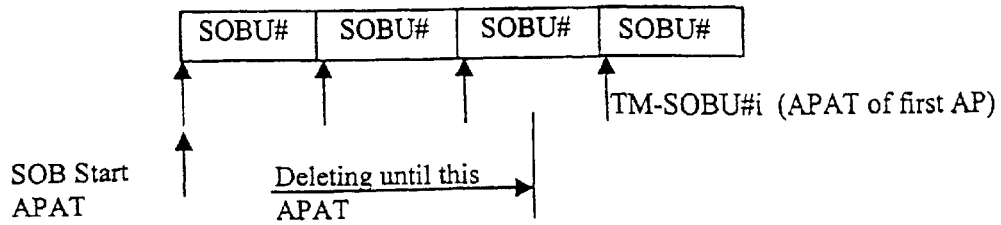
FIG. 26 shows deleting part of a Streamer Object using STREAMER.IFO and STREAMER.SOB.
Figure 26B:
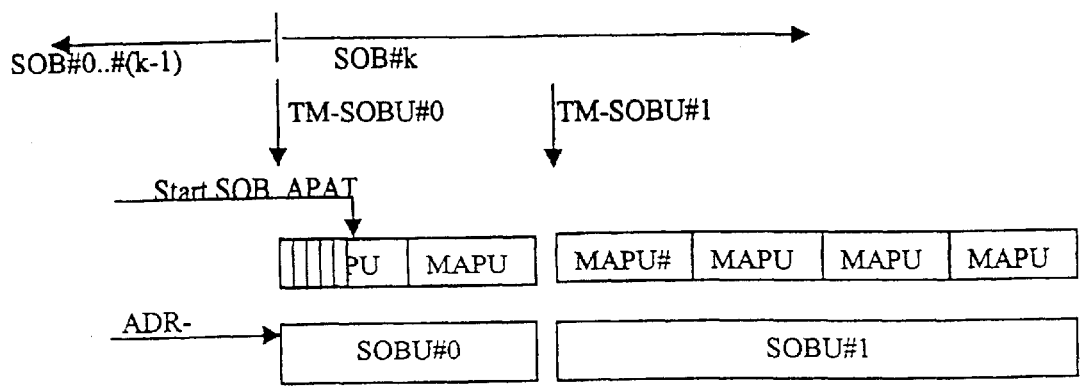

Next, the second method, using STREAMER.IFO data+STREAMER.SOB Will be explained with reference to FIG. 26A (showing the situation before partial deleting of a SOB) and FIG. 26B (showing the situation after partial deleting a SOB).

The SOBU with the new start/end point is read in memory. The TM-APP are read and it is decided in what sector the new start/end should be. Suppose the new start APAT is situated in sector #7 of MAPU#2 of SOBU#2. In the SOBU-MAPL the SOBU entries#0 and #1 are removed, all others are shifted one position downwards. The ADR-OFS of this SOB is not changed (the offset of SOBs with a higher number is lowered with the number of sectors which are removed). MAPU#0 and MAPU#1 from SOBU#2 are made free. After deleting SOBU#0 contains less MAPUs than mentioned in the General Information SOBU-size field. The number of MAPUs in the first (and last) SOBU of SOB#k are mentioned in the general info of SOBU-MAPL. The APAT of the first application packet in the first MAPU of SOBU#0 is listed in the TM-SOBU#0 entry (as in previous example). In the General Info of PRES-MAPL the offset in SOBU numbering is set to 2.

Figure 27A:
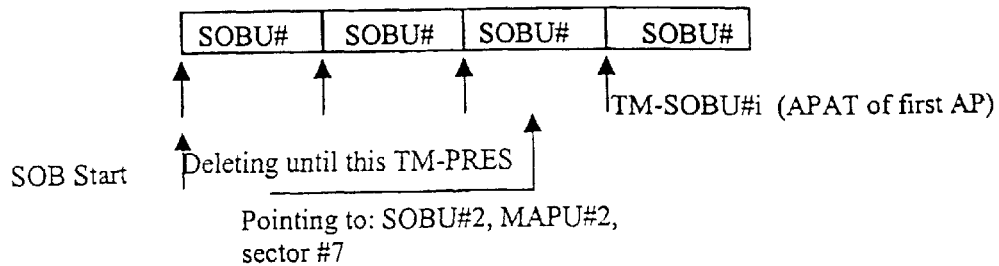
FIG. 27 shows deleting part of a Streamer Object using the Presentation Mapping List (PRES-MAPL)
Figure 27B:
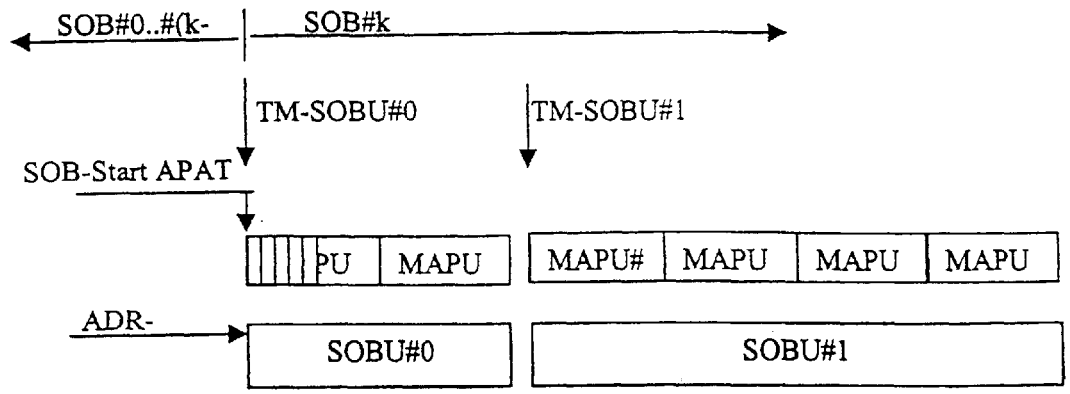

Next, partial deleting the PRES-MAPL is illustrated briefly with FIG. 27A (showing the situation before deleting) and FIG. 27B (showing the situation after deleting). For TM-SOBU#0 the previous value of TM-SOBU#2 is taken. SOB-Start APAT is made equal to TM-SOBU#0SOB-Start PTS is the new PTS value.

Figure 28:
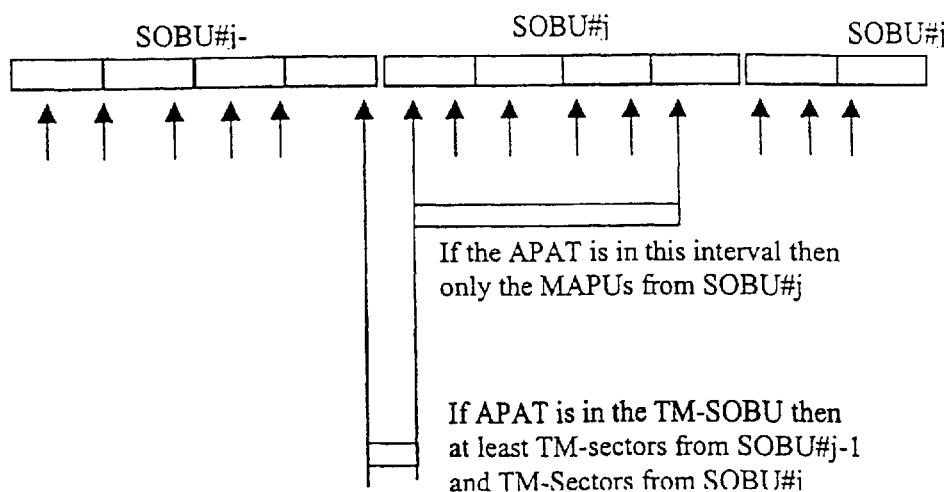
FIG. 28 shows retrieval of data.
Figure 29:
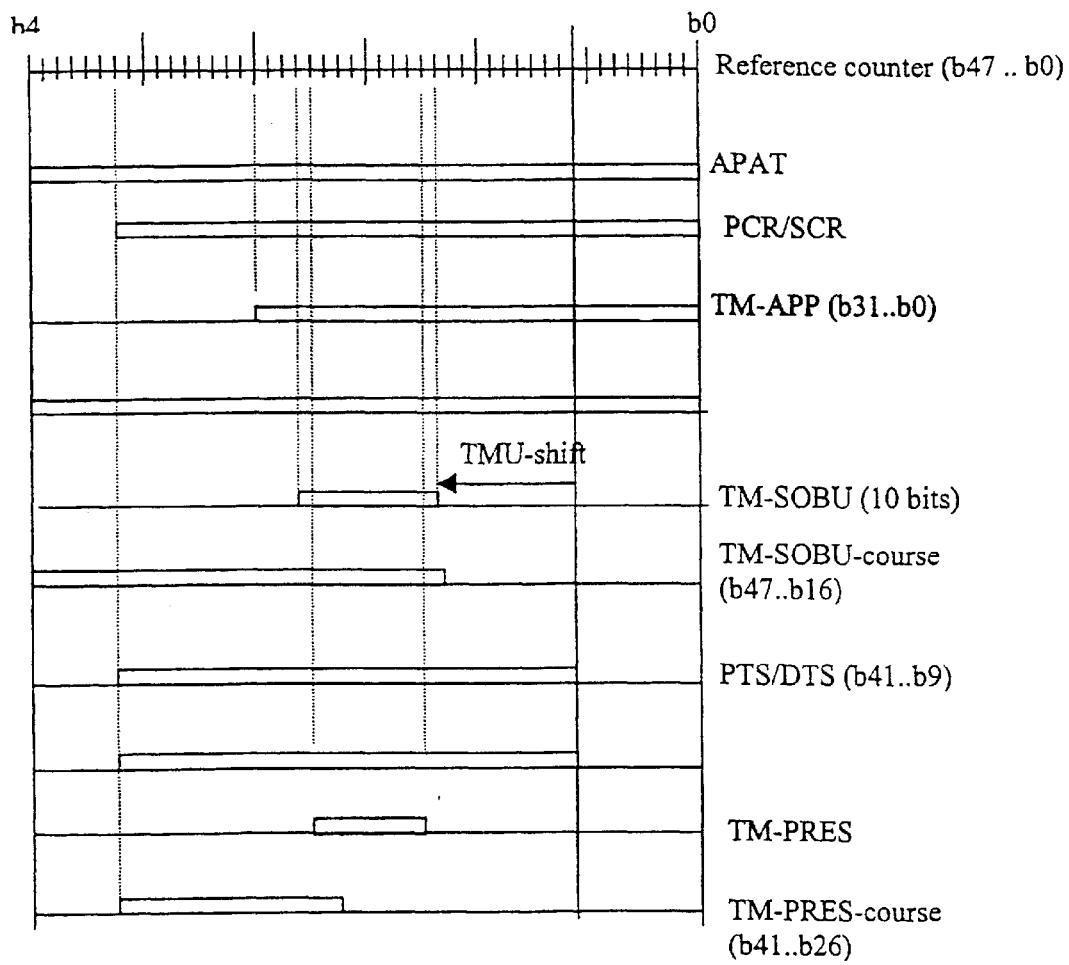
FIG. 29 shows several Times Stamps.

The retrieval of data is will be discussed hereafter with reference to FIG. 28. Reading is started at APAT=xxx while the SOBU#x entry is found (in this case SOBU#j). With TMU-shift=10. Weight of TM-SOBU LSB is 11 msec. With an average bitrate of 8 Mbps the number in TM-Sectors is ~5. If the APAT is in the TM-SOBU then it is sufficient to read the last MAPU from SOBU#j−1 and the first MAPU of SOBU#j Finally, an overview of the mentioned time stamps is shown in FIG. 29.

The invention lies in each and every novel feature or combination of features. The scope of the invention is not limited to the embodiments, any reference signs do not limit the scope of the claims and the invention can be implemented by means of both hardware and software, and that several "means" may be represented by the same item of hardware. Furthermore, the word 'comprising' does not exclude the presence of other elements or steps than those listed in the claims.

What is claimed is:

1. Method of storing a substantially real time stream of information signals representing information arranged in separate, consecutive data packets of digital format on a disc like record carrier, the disc like record carrier having units of recording of a predetermined size larger than a size of the data packets, the method comprising:

receiving the serial stream of information signals, detecting the data packets in the serial stream of information signals, establishing a time of arrival of the data packets and generating a time stamp related to the time of arrival of a data packet, the method further characterized by, collecting a data packet and a related time stamp in a source packet, collecting multiple source packets in a stream pack (S_PCK) with a pack header, the size of the stream pack (S_PCK) corresponding to the predetermined size of the unit of allocation of the disc like record carrier and storing source packet retrieval information in the stream pack (S-PCK).

2. Method according to claim 1, wherein the stream pack (S_PCK) has a fixed size of 2048 byte.

3. Method according to claim 2, wherein the pack header starts with a start code area (Start_code_prefix) of 3 bytes and immediately followed by a stream identification area (Stream_id) of 1 byte.

4. Method according to claim 3, wherein the stream identification area comprises identification information identifying a private_stream_2 according to the MPEG coding format.

5. Method according to claim 4, wherein the source packet retrieval information comprises the number of beginnings (Number_of_start) of a source packet in the corresponding stream pack (S_PCK) and information related to the position of the first byte (Start_offset_first_packet) of the first source packet in the corresponding stream pack (S-the PCK).

6. System for storing a substantially real time stream of information signals representing information arranged in separate, consecutive data packets of digital format on a disc like record carrier, the disc like record carrier having units of recording of a predetermined size larger than a size of the data packets, said system comprising receiving means for receiving the serial stream of information signals, streaming means connected to said receiving means for streaming the received information signals for recording to a disc like record carrier, the streaming means comprising:

local clock reference means and time stamp generating means for generating a time stamp corresponding to a time of arrival of a data packet;

recording means connected to the streaming means for recording streamed information signals on a disc like record carrier, characterized in that, the streaming means comprises collecting means for collecting a received data packet and related time stamp in a source packet and for collecting a multiple of source packets in a stream pack with a pack header, the size of the stream pack (S_PCK) corresponding to the predetermined size of the unit of recording of the disc like record carrier, the collecting means being adapted to store data packet retrieval information in the stream pack (S-PCK), recording means for recording the stream packs (S-PCK) onto a disc like record carrier.

7. System according to claim 6, characterized in that, the stream pack (S-PCK) has a fixed size of 2048 byte.

8. System according to claim 7, characterized in that, the pack header starts with a start code area (Start_code_prefix) of 3 bytes and immediately followed by a stream identification area (Stream_id) of 1 byte.

9. System according to claim 8, characterized in that, wherein the stream identification area comprises identification information identifying a private_stream_2 according to the MPEG coding format.

10. System according to claim 9, characterized in that, the source packet retrieval information comprises the number of beginnings (Number_of_start) of a source packet in the corresponding stream pack (S_PCK) and information related to the position of the first byte (Start_offset_first_packet) of the first source packet in the corresponding stream pack (S-PCK).

11. Streaming means for use in a system according to claim 6.

12. System for reproducing a substantially real time stream of information signals representing information arranged in separate consecutive data packets of digital format, the system comprising reading means for reading from a disc like record carrier stream packs (S-PCK) corresponding to the unit of recording on a disc like record carrier, the stream packs (S-PCK) having a size larger then the size of the data packets, wherein a stream pack (S-PCK) comprises a multiple of data packets each arranged in a source packet with a corresponding time stamp, the stream pack (S-PCK) comprising a pack header with data packet retrieval information, characterized in that, the streaming means comprise recovering means adapted to recover from stream packs (S-PCK) the source packets in correspondence with the data packet retrieval information and timing recovery means adapted to output the data packets as a substantially real time stream in accordance with the corresponding time stamp.

13. System according to claim 12, wherein the stream pack (S-PCK) has a fixed size of 2048 byte.

14. System according to claim 13, wherein the pack header starts with a start code area (Start_code_prefix) of 3 bytes and immediately followed by a stream identification area (Stream_id) of 1 byte.

15. System according to claim 14, wherein the stream identification area comprises identification information identifying a private_stream_2 according to the MPEG coding format.

16. System according to claim 15, wherein the source packet retrieval information comprises the number of beginnings (Number_of_start) of a source packet in the corresponding stream pack (S_PCK) and information related to the position of the first byte (Start_offset_first_packet) of the first source packet in the corresponding stream pack (S-PCK).

* * * * *